United States Patent
Guthrie et al.

(10) Patent No.: US 10,216,519 B2
(45) Date of Patent: Feb. 26, 2019

(54) MULTICOPY ATOMIC STORE OPERATION IN A DATA PROCESSING SYSTEM

(71) Applicant: INTERNATIONAL BUSINESS MACHINES CORPORATION, Armonk, NY (US)

(72) Inventors: Guy L. Guthrie, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/825,387

(22) Filed: Nov. 29, 2017

(65) Prior Publication Data

US 2018/0349138 A1    Dec. 6, 2018

Related U.S. Application Data

(63) Continuation of application No. 15/613,231, filed on Jun. 4, 2017.

(51) Int. Cl.
  *G06F 9/30* (2018.01)
  *G06F 9/46* (2006.01)
  *G06F 12/0875* (2016.01)

(52) U.S. Cl.
  CPC .......... *G06F 9/30043* (2013.01); *G06F 9/467* (2013.01); *G06F 12/0875* (2013.01); *G06F 2212/452* (2013.01)

(58) Field of Classification Search
  CPC ...................................................... G06F 9/467
  See application file for complete search history.

(56) References Cited

U.S. PATENT DOCUMENTS

| | | | |
|---|---|---|---|
| 2010/0262786 A1* | 10/2010 | Cummings | G06F 12/0815 711/141 |
| 2014/0013060 A1* | 1/2014 | Frey | G06F 12/0813 711/146 |

OTHER PUBLICATIONS

Flur, Shaked, et al. "Mixed-size concurrency: ARM, POWER, C/C++ 11, and SC." Proceedings of the 44th ACM SIGPLAN Symposium on Principles of Programming Languages. ACM, 2017.
Guthrie et al., U.S. Appl. No. 15/613,231, filed Jun. 4, 2017, Non-Final Office Action dated Oct. 5, 2018.

* cited by examiner

*Primary Examiner* — Gary W. Cygiel
(74) *Attorney, Agent, or Firm* — Brian F. Russell; Grant Johnson

(57) ABSTRACT

A data processing system implementing a weak memory model includes a plurality of processing units coupled to an interconnect fabric. In response execution of a multicopy atomic store instruction, an initiating processing unit broadcasts a store request on the interconnect fabric to obtain coherence ownership of a target cache line. The initiating processing unit posts a kill request to at least one of the plurality of processing units to request invalidation of a copy of the target cache line. In response to successful posting of the kill request, the initiating processing unit broadcasts a store complete request on the interconnect fabric to enforce completion of the invalidation of the copy of the target cache line. In response to the store complete request receiving a coherence response indicating success, the initiating processing unit permits an update to the target cache line requested by the multicopy atomic store instruction to be atomically visible.

7 Claims, 12 Drawing Sheets

FIG. 6       PRIOR ART

MULTICOPY ATOMIC STORE OPERATION IN A DATA PROCESSING SYSTEM

BACKGROUND

This disclosure relates generally to data processing and, more specifically, to a multicopy atomic store operation in a data processing system.

A conventional symmetric multiprocessor (SMP) computer system, such as a server computer system, includes multiple processing units all coupled to a system interconnect, which typically comprises one or more address, data, and control buses. Coupled to the system interconnect is a system memory, which represents the lowest level of addressable memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

In data processing systems that implement weak (or weak consistency) memory models, instructions may be arbitrarily re-ordered by the processor cores for execution as long as dependencies are observed and the operations are not otherwise restricted from being executed out-of-order. In addition, memory updates may be non-multicopy atomic, meaning that any given memory update may propagate to differing processors at differing times instead of becoming visible to all processors (other than the initiating processor) at the same time. In such data processing systems, out-of-order execution of memory access instructions can be restricted and multicopy atomicity of like size memory updates can be enforced through the use of barrier (or synchronization) instructions. As is known in the art, a barrier instruction prevents execution of subsequent memory access instructions (e.g., store and/or load instructions following the barrier instruction in program order) until all prior memory access instructions (e.g., any load or store instructions preceding the barrier instruction in program order) are resolved.

In a conventional data processing system that implements a snoop-based coherence protocol, the memory access ordering indicated by a barrier instruction is enforced by the processor core that executes the barrier instruction initiating broadcast of a barrier operation on the system interconnect to all processing units of the data processing system. In response to snooping the barrier operation on the system interconnect, the processing units provide appropriate coherence responses to ensure that the barrier operation is not permitted to successfully complete until the relevant memory accesses preceding the barrier have resolved. Once the barrier operation successfully completes, the initiating processor core is permitted to continue execution of memory access instructions following the barrier instruction.

In the presence of like size memory accesses (e.g., all accesses to any given memory location are made by accesses of the same size), ordering a store access preceding a barrier instruction with subsequent memory accesses following the barrier instruction and ensuring that the store data written by the stores access is propagated completely prior to allowing any of the subsequent memory accesses to initiate restores the appearance of multicopy atomicity to the processing units that may subsequently consume the store data written to the memory subsystem by the store access. That is, the ordering provided by the barrier instruction provides the same effect as if the store data were made simultaneously available to all processing units (despite any actual variance in the timing of data availability due to system topology and/or the structure and operation of the cache hierarchies). However, the present disclosure recognizes that use of conventional barrier instructions cannot fully restore multicopy atomicity in data processing systems implementing a weak memory model if mixed-size conflicting accesses are permitted.

SUMMARY

The present disclosure recognizes it would be desirable to provide the appearance of multicopy atomicity in a data processing system implementing a weak memory model without requiring the broadcast of a barrier operation as described above.

According to one embodiment, a data processing system implementing a weak memory model includes a plurality of processing units coupled to an interconnect fabric. In response execution of a multicopy atomic store instruction, an initiating processing unit broadcasts a store request on the interconnect fabric to obtain coherence ownership of a target cache line. The initiating processing unit posts a kill request to at least one of the plurality of processing units to request invalidation of a copy of the target cache line. In response to successful posting of the kill request, the initiating processing unit broadcasts a store complete request on the interconnect fabric to enforce completion of the invalidation of the copy of the target cache line. In response to the store complete request receiving a coherence response indicating success, the initiating processing unit permits an update to the target cache line requested by the multicopy atomic store instruction to be atomically visible.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
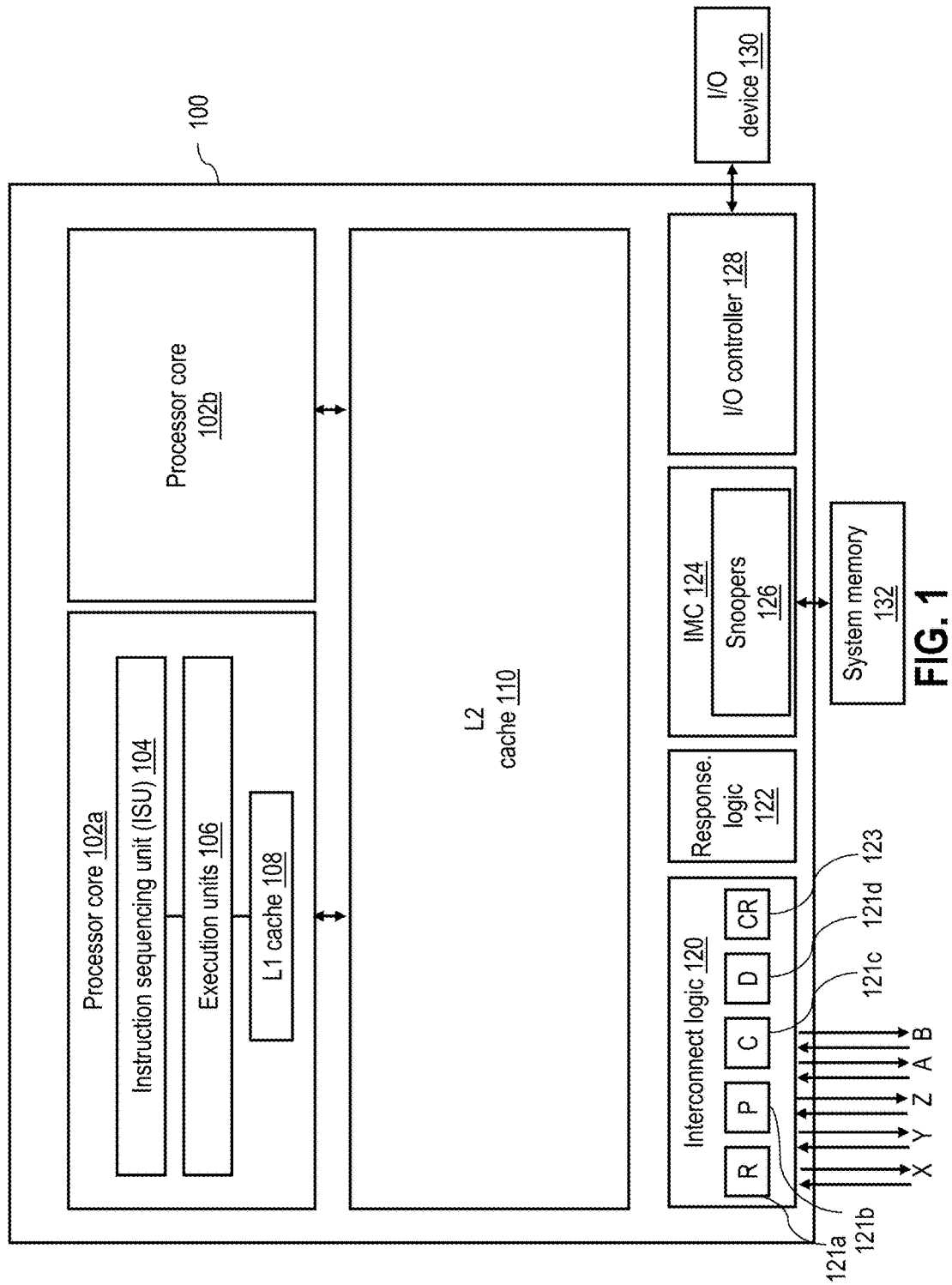
FIG. 1 is a diagram of a relevant portion of a processing unit configured according to aspects of the present disclosure.

With reference now to the figures and, in particular, with reference to FIG. 1, there is illustrated a high level block diagram of an exemplary embodiment of a processing unit 100 in accordance with the present disclosure. In the depicted embodiment, processing unit 100 is a single integrated circuit including multiple processor cores 102a, 102b for independently processing instructions and data. Each processor core 102 includes an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and memory access instructions that request read and write access to a memory block. For example, execution units 106 may include one or more floating-point units (FPUs), one or more load-store units (LSUs), and one or more integer units (IUs).

The operation of each processor core 102a, 102b is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric (described below) by snoopers 126.

In the illustrative embodiment, the cache memory hierarchy of processing unit 100 includes a store-through level one (L1) cache 108 within each processor core 102a, 102b and a level two (L2) cache 110 shared by all processor cores 102a, 102b of the processing unit 100. Although the illustrated cache hierarchy includes only two levels of cache, those skilled in the art will appreciate that alternative embodiments may include additional levels (level three (L3), level four (L4), etc.) of on-chip or off-chip in-line or look-aside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number t1 of "first tier" interconnect links, which in this case include in-bound and out-bound 'X', 'Y' and 'Z' links. Interconnect logic 120 further supports an arbitrary number t2 of second tier links, designated in FIG. 1 as in-bound and out-bound 'A' and 'B' links. Interconnect logic 120 includes request logic (labeled 'R') 121a, partial response logic (labeled 'P') 121b, combined response logic (labeled 'C') 121c and data logic (labeled 'D') 121d for processing and forwarding information during different phases of operations. In addition, interconnect logic 120 includes a configuration register (labeled 'CR') 123 including a plurality of mode bits utilized to configure processing unit 100. These mode bits preferably include: (1) a first set of one or more mode bits that selects a desired link information allocation for the first and second tier links; (2) a second set of mode bits that specify which of the first and second tier links of the processing unit 100 are connected to other processing units 100; and (3) a third set of mode bits that determines a programmable duration of a protection window extension.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue operations and receive data on the 'X', 'Y', 'Z', 'A', and 'B' links in response to requests by I/O device 130.

Figure 2:
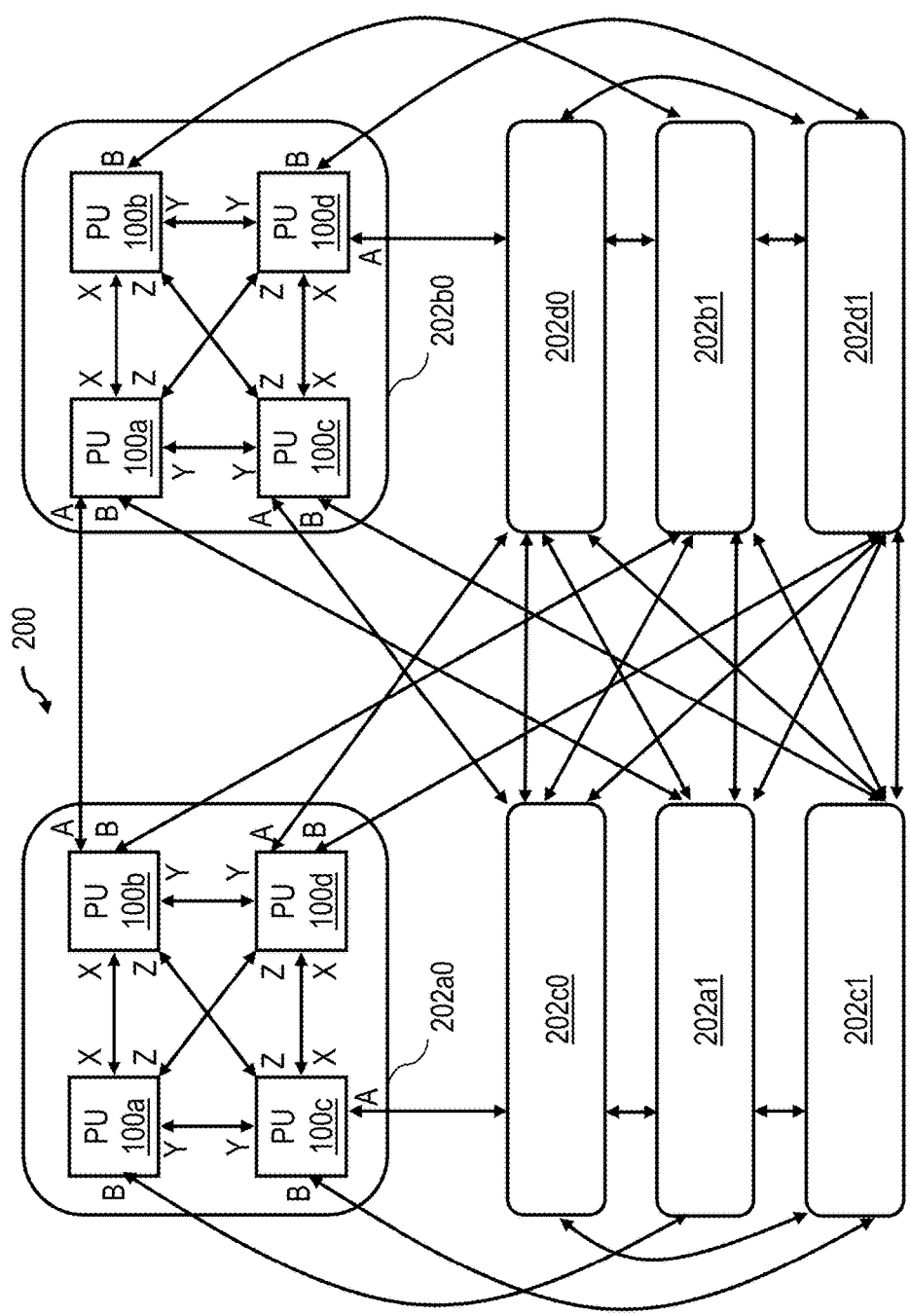
FIG. 2 is a diagram of a relevant portion of an exemplary data processing system configured according to aspects of the present disclosure.

Referring now to FIG. 2, there is depicted a block diagram of an exemplary embodiment of a data processing system 200 formed of multiple processing units 100 in accordance with the present invention. As shown, data processing system 200 includes eight processing nodes 202a0-202d0 and 202a1-202d1, which may each be realized as a multi-chip module (MCM) comprising a package containing four processing units 100. The processing units 100 within each processing node 202 are coupled for point-to-point communication by the processing units 'X', 'Y', and 'Z' links, as shown. Each processing unit 100 may be further coupled to processing units 100 in two different processing nodes 202 for point-to-point communication by the processing units' 'A' and 'B' links. Although illustrated in FIG. 2 with a double-headed arrow, it should be understood that each pair of 'X', 'Y', 'Z', 'A', and 'B' links are preferably (but not necessarily) implemented as two uni-directional links, rather than as a bi-directional link.

General expressions for forming the topology shown in FIG. 2 can be given as follows:

Node[I][K].chip[J].link[K] connects to Node[J ][K].chip [I].link[K], for all I≠J; and Node[I][K].chip[I].link[K] connects to Node[I][not K].chip[I].link[not K]; and Node[I ][K].chip[I].link[not K] connects either to:
  (1) Nothing in reserved for future expansion; or
  (2) Node[extra][not K].chip[I].link[K], in case in which all links are fully utilized (i.e., nine 8-way nodes forming a 72-way system); and
  where I and J belong to the set {a, b, c, d} and K belongs to the set {0,1}.

Of course, alternative expressions can be defined to form other functionally equivalent topologies. Moreover, it should be appreciated that the depicted topology is representative but not exhaustive of data processing system topologies embodying the present invention and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J).

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

Figure 3:
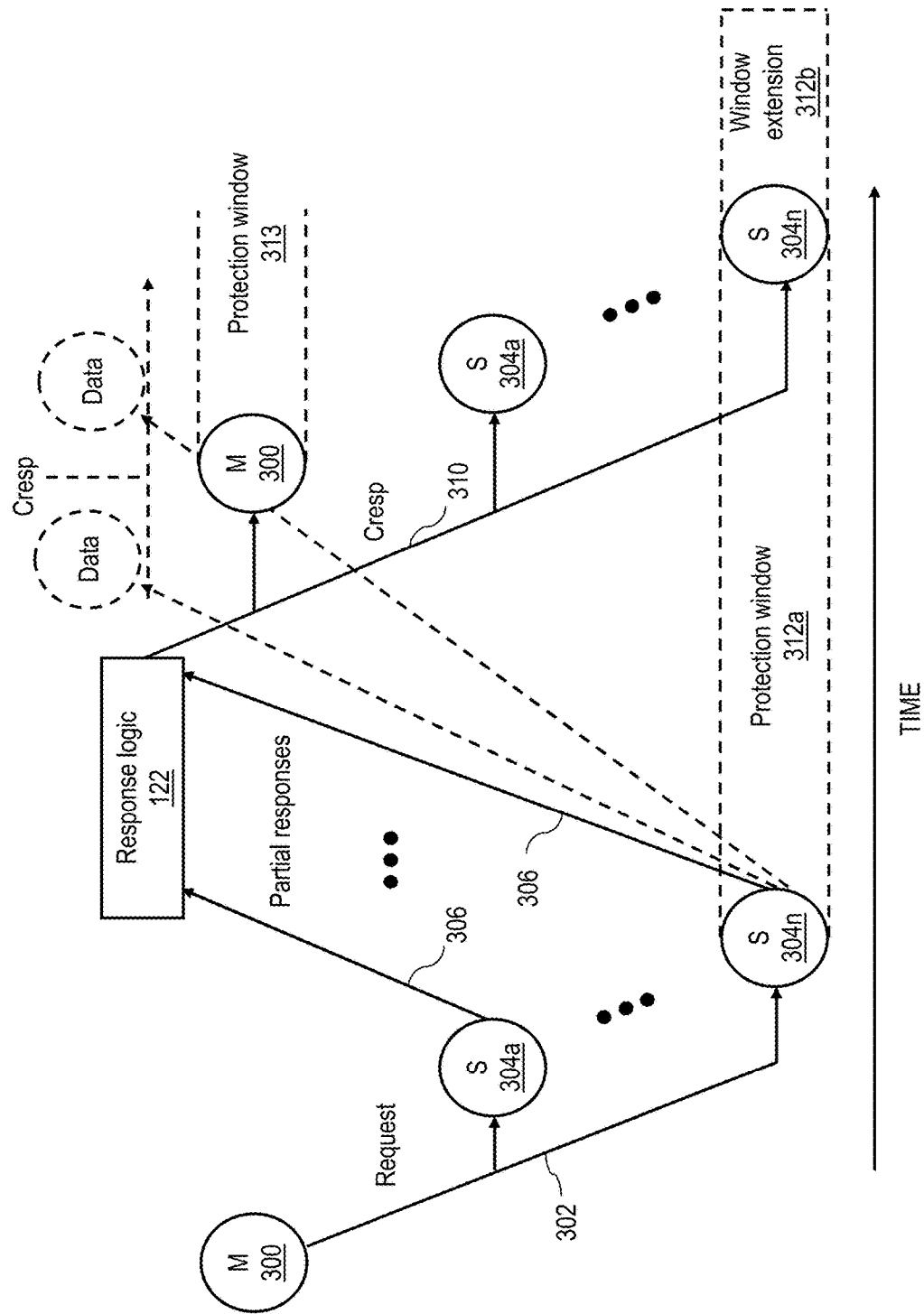
FIG. 3 is a diagram of an exemplary interconnect operation including a request phase, a partial response (Presp) phase, and a combined response (Cresp) phase implemented within the data processing system of FIG. 2.
Figure 5:
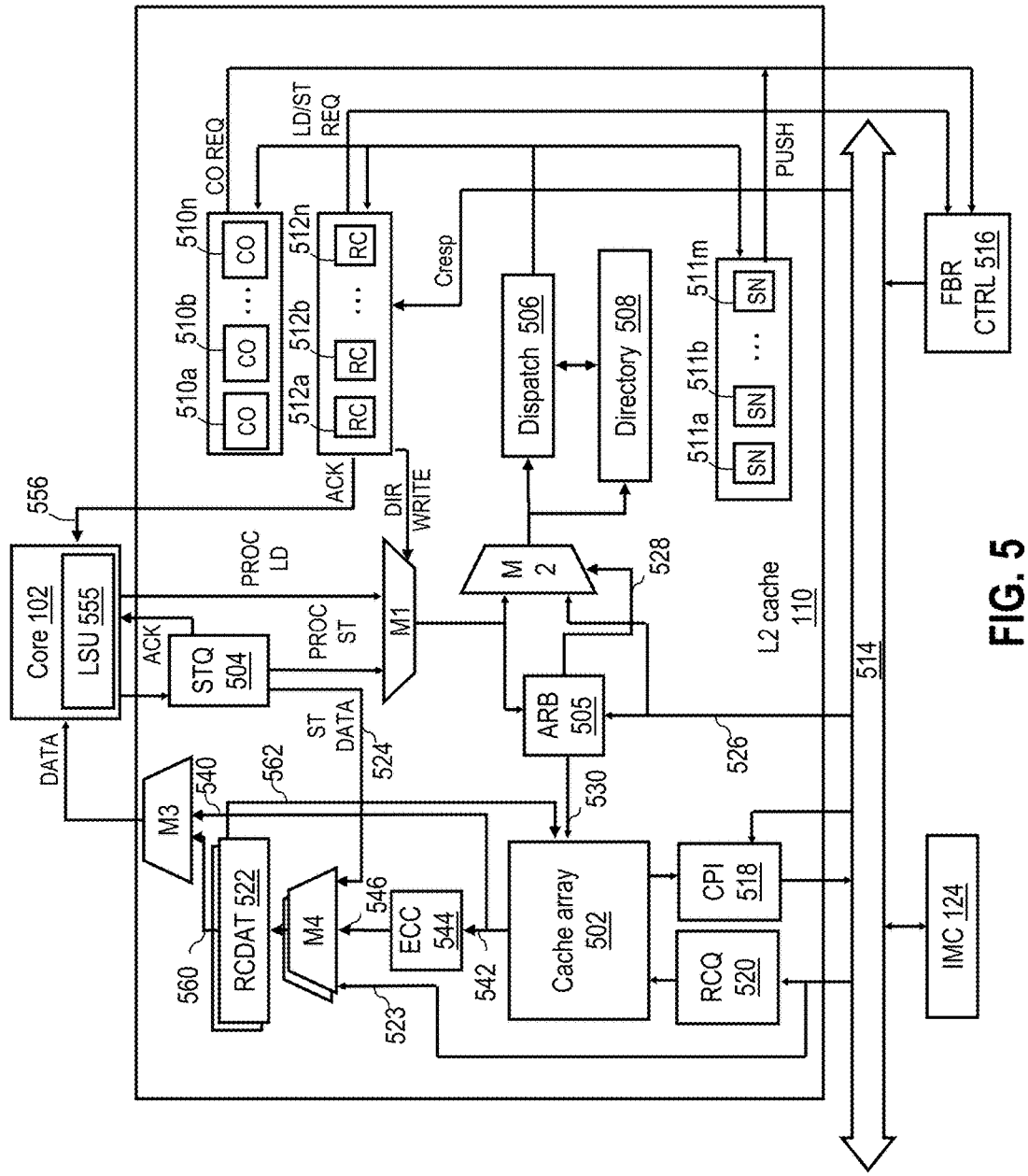
FIG. 5 is a more detailed diagram of the L2 cache of FIG. 1.

Referring now to FIG. 3, there is depicted a time-space diagram of an exemplary operation on the interconnect fabric of data processing system 200 of FIG. 2. The operation begins when a master 300 (e.g., an RC machine 512 of an L2 cache 110 (as shown in FIG. 5) or a master within an I/O controller 128) issues a request 302 on the interconnect fabric. Request 302 preferably includes at least an operation type indicating a type of desired access and a resource identifier (e.g., real address) indicating a resource to be accessed by the request. Common types of requests can include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and to immediately copy the image of the memory block from a higher level memory to a lower level memory in preparation for the destruction of the higher level copy |
| PARTIAL WRITE | Requests authority to create a new unique copy of a partial memory block without regard to its present state |
| KILL | Requests invalidation of all cached copies a memory block, except local to the requesting master |

Further details regarding these operations and an exemplary cache coherency protocol that facilitates efficient handling of these operations may be found in U.S. Pat. No. 7,774,555, which is incorporated herein by reference in its entirety for all purposes.

Request 302 is received by snoopers 304a-304n (e.g., snoop machines 511 of L2 caches 110 (see, e.g., FIG. 5) and snoopers 126 of IMCs 124) distributed throughout data processing system 200. In general, with some exceptions, snoopers 304 in the same L2 cache 110 as the master 300 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 representing the response of at least that snooper 304 to request 302. A snooper 126 within an IMC 124 determines the partial response 306 to provide based, for example, upon whether the IMC 124 is responsible for the request address and whether it has resources available to service the request. A snoop machine 511 of an L2 cache 110 may determine its partial response 306 based on, for example, the availability of its L2 cache directory 114 and the coherency state associated with the request address in L2 cache directory 114.

The partial responses 306 of snoopers 304 are logically combined either in stages or all at once by one or more instances of response logic 122 to determine a system-wide combined response (Cresp) 310 to request 302. In one embodiment, which is assumed hereinafter, the instance of response logic 122 responsible for generating Cresp 310 is located in the processing unit 100 containing the master 300 that issued request 302. Response logic 122 provides Cresp 310 to master 300 and snoopers 304 via the interconnect fabric to indicate the system-wide response (e.g., success, failure, retry, etc.) to request 302. If Cresp 310 indicates success of request 302, Cresp 310 may indicate, for example, a data source for a requested memory block, a cache state in which the requested memory block is to be cached by master 300, and whether "cleanup" operations (e.g., kill operations) invalidating the requested memory block in one or more L2 caches 110 are required.

In response to receipt of Cresp 310, one or more of master 300 and snoopers 304 typically perform one or more operations in order to service request 302. These operations may include supplying data to master 300, invalidating or otherwise updating the coherence state of data cached in one or more L2 caches 110, performing castout operations, writing back data to a system memory 132, etc. If required by request 302, a requested or target memory block may be transmitted to or from master 300 before or after the generation of Cresp 310 by response logic 122.

The partial response 306 of a snooper 304 to a request 302 and the operations performed by the snooper 304 in response to the request 302 and/or its combined response 310 can be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherence state(s) within the cache directory of an L2 cache 110.

Still referring to FIG. 3, the HPC, if any, for a memory block referenced in a request 302, or in the absence of an HPC, the LPC of the memory block, preferably has the responsibility of protecting the transfer of coherence ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of coherence ownership of the requested memory block to master 300 during a protection window 312a that extends from the time that snooper 304n determines its partial response 306 until snooper 304n receives Cresp 310 and during a subsequent window extension 312b extending a programmable time beyond receipt by snooper 304n of Cresp 310. During protection window 312a and window extension 312b, snooper 304n protects the transfer of ownership by providing partial responses 306 to other requests specifying the same request address that prevent other masters from obtaining coherence ownership (e.g., a Retry partial response) until ownership has been successfully transferred to master 300. Master 300 likewise initiates a protection window 313 to protect its coherence ownership of the memory block requested in request 302 following receipt of combined response 310.

Because snoopers 304 all have limited resources for handling the CPU and I/O requests described above, several different levels of partial responses and corresponding Cresps are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that it is the LPC for the memory block, but is unable to currently service the request. Similarly, an L2 cache 110 may require an available snoop machine 511 (see, e.g., FIG. 5) and access to L2 cache directory 114 in order to handle a request. Absence of access to either (or both) of these resources results in a partial response (and corresponding Cresp) signaling an inability to service the request due to absence of a required resource.

As is further illustrated in FIG. 3, snooper 304n may return data (e.g., for a load instruction) to master 300 (e.g., an RC machine 512 of L2 cache 110) before or after master 300 receives a Cresp (for the load instruction) from response logic 122.

Figure 4:
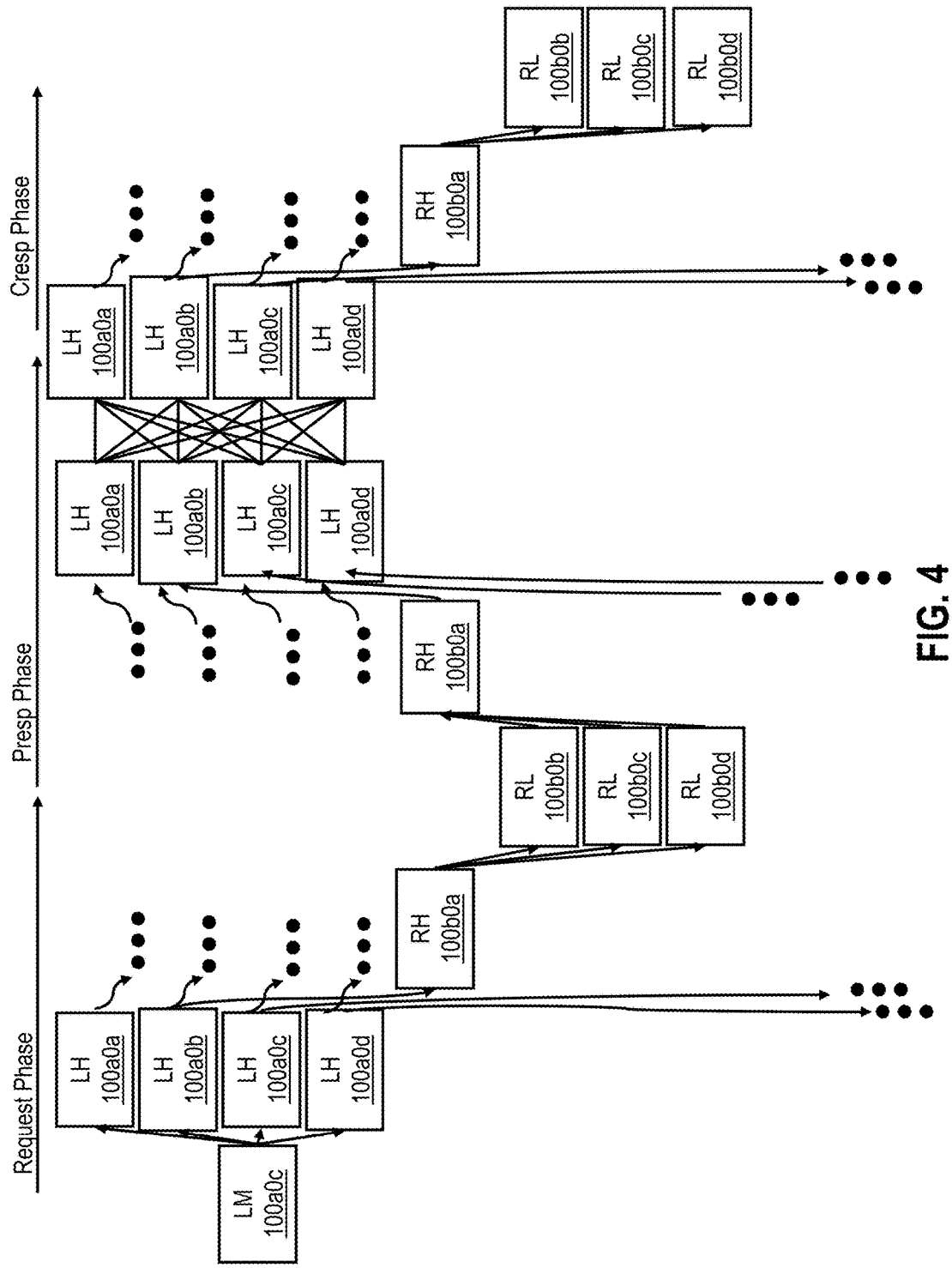
FIG. 4 is a time-space diagram of the flow of an exemplary operation within the data processing system of FIG. 2.

Referring now to FIG. 4, there is depicted a time-space diagram of an exemplary operation flow in data processing system 200 of FIG. 2. In these figures, the various processing units 100 within data processing system 200 are tagged with two locational identifiers—first identifying the processing node 202 to which the processing unit 100 belongs and a second identifying the particular processing unit 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Still referring to FIG. 4, the request phase begins when a local master 100a0c (i.e., processing unit 100c of processing node 202a0) performs a synchronized broadcast of a request, for example, a read request, to each of the local hubs 100a0a, 100a0b, 100a0c and 100a0d within its processing node 202a0. It should be noted that the list of local hubs includes local hub 100a0c, which is also the local master. This internal transmission may be advantageously employed to synchronize the operation of local hub 100a0c with local hubs 100a0a, 100a0b and 100a0d so that the timing constraints can be more easily satisfied.

In response to receiving the request, each local hub 100 that is coupled to a remote hub 100 by its 'A' or 'B' links transmits the operation to its remote hub(s) 100. Thus, local hub 100a0a makes no transmission of the operation on its outbound 'A' link, but transmits the operation via its outbound 'B' link to a remote hub within processing node 202a1. Local hubs 100a0b, 100a0c and 100a0d transmit the operation via their respective outbound 'A' and 'B' links to remote hubs in processing nodes 202b0 and 202b1, processing nodes 202c0 and 202c1, and processing nodes 202d0 and 202d1, respectively. Each remote hub 100 receiving the operation, in turn, transmits the operation to each remote leaf 100 in its processing node 202. Thus, for example, remote hub 100b0a transmits the operation to remote leaves 100b0b, 100b0c and 100b0d. In this manner, the operation is efficiently broadcast to all processing units 100 within data processing system 200 utilizing transmission over no more than three links.

Following the request phase, the partial response (Presp) phase occurs. In the partial response phase, each remote leaf 100 evaluates the operation and provides its partial response to the operation to its respective remote hub 100. For example, remote leaves 100b0b, 100b0c and 100b0d transmit their respective partial responses to remote hub 100b0a. Each remote hub 100 in turn transmits these partial responses, as well as its own partial response, to a respective one of local hubs 100a0a, 100a0b, 100a0c and 100a0d. Local hubs 100a0a, 100a0b, 100a0c and 100a0d then broadcast these partial responses, as well as their own partial responses, to each local hub 100 in processing node 202a0. It should be noted that the broadcast of partial responses by the local hubs 100 within processing node 202a0 includes, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub and remote leaf Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

As further shown in FIG. 4, response logic 122 at each local hub 100 within processing node 202a0 compiles the partial responses of the other processing units 100 to obtain a combined response representing the system-wide response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, local hub 100a0b transmits the combined response to remote hub 100b0a, which in turn transmits the combined response to remote leaves 100b0b, 100b0c and 100b0d.

As noted above, servicing the operation may require an additional data phase. For example, if the operation is a read-type operation, such as a read or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b.

Of course, the scenario depicted in FIG. 4 is merely exemplary of the myriad of possible operations that may occur concurrently in a multiprocessor data processing system such as data processing system 200.

As described above with reference to FIG. 3, coherency is maintained during the "handoff" of coherency ownership of a memory block from a snooper 304n to a requesting master 300 in the possible presence of other masters competing for ownership of the same memory block through protection window 312a, window extension 312b, and protection window 313. For example, protection window 312a and window extension 312b must together be of sufficient duration to protect the transfer of coherency ownership of the requested memory block to winning master (WM) 300 in the presence of a competing request by a competing master (CM). To ensure that protection window 312a and window extension 312b have sufficient duration to protect the transfer of ownership of the requested memory block to winning master 300, the latency of communication between processing units 100 in accordance with FIG. 4 is preferably constrained such that the following conditions are met:

$$A\_lat(CM\_S) \leq A\_lat(CM\_WM) + C\_lat(WM\_S) + \varepsilon,$$

where A_lat(CM_S) is the address latency of any competing master (CM) to the snooper (S) 304n owning coherence of the requested memory block, A_lat(CM_WM) is the address latency of any competing master (CM) to the "winning" master (WM) 300 that is awarded coherency ownership by snooper 304n, C_lat(WM_S) is the combined response latency from the time that the combined response is received by the winning master (WM) 300 to the time the combined response is received by the snooper (S) 304n owning the requested memory block, and $\varepsilon$ is the duration of window extension 312b.

If the foregoing timing constraint, which is applicable to a system of arbitrary topology, is not satisfied, the request of the competing master may be received (1) by winning master 300 prior to winning master 300 assuming coherency ownership and initiating protection window 312b and (2) by snooper 304n after protection window 312a and window extension 312b end. In such cases, neither winning master 300 nor snooper 304n will provide a partial response to the competing request that prevents the competing master from assuming coherency ownership of the memory block and reading non-coherent data from memory. However, to avoid this coherency error, window extension 312b can be programmably set (e.g., by appropriate setting of configuration register (CR) 123) to an arbitrary length ($\varepsilon$) to compensate for latency variations or the shortcomings of a physical implementation that may otherwise fail to satisfy the timing constraint that must be satisfied to maintain coherency. Thus, by solving the above equation for $\varepsilon$, the ideal length of window extension 312b for any implementation can be determined.

Several observations may be made regarding the foregoing timing constraint. First, the address latency from the competing master to the owning snooper 304a has no necessary lower bound, but must have an upper bound. The upper bound is designed for by determining the worst case latency attainable given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration.

Although for a given operation, each of the winning master 300 and competing master has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304n has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master to winning master 300 have no necessary upper or lower bounds.

The first tier and second tier links connecting processing units 100 may be implemented in a variety of ways to obtain the topology depicted in FIG. 2 and to meet timing constraints. In one preferred embodiment, each inbound and outbound first tier ('X', 'Y', and 'Z') link and each inbound and outbound second tier ('A' and 'B') link is implemented as a uni-directional bus containing a number of different virtual channels or tenures to convey address, data, control and coherency information.

With reference now to FIG. 5, there is illustrated a more detailed block diagram of an exemplary L2 cache 110 in accordance with one embodiment. As shown in FIG. 5, L2 cache 110 includes a cache array 502 and a directory 508 of the contents of cache array 502. Although not explicitly illustrated, cache array 502 preferably is implemented with a single read port and single write port to reduce the die area required to implement cache array 502.

Assuming cache array 502 and directory 508 are set associative as is conventional, memory locations in system memory 132 are mapped to particular congruence classes within cache array 502 utilizing predetermined index bits within the system memory (real) addresses. The particular memory blocks stored within the cache lines of cache array 502 are recorded in cache directory 508, which contains one directory entry for each cache line. While not expressly depicted in FIG. 5, it will be understood by those skilled in the art that each directory entry in cache directory 508 includes various fields, for example, a tag field that identifies the real address of the memory block held in the corresponding cache line of cache array 502 and a state field that indicate the coherence state of the cache line.

L2 cache 110 further includes multiple (e.g., 16) read-claim (RC) machines 512a-512n for independently and concurrently servicing load (LD) and store (ST) requests received from the affiliated processor core 102. In addition, L2 cache 110 includes multiple snoop machines 511a-511m to service remote memory access requests originating from processor cores 102 other than the affiliated processor core 102. Each snoop machine 511 can independently and concurrently handle a remote memory access request snooped from local interconnect 514. As will be appreciated, the servicing of memory access requests by RC machines 512 may require the replacement or invalidation of memory blocks within cache array 502. Accordingly, L2 cache 110 includes CO (castout) machines 510 that manage the removal and writeback of memory blocks from cache array 502.

Arbiter 505 of L2 cache 110 is configured to control multiplexers M1-M2 to order the processing of local memory access requests received from affiliated processor core 102 and remote requests snooped on local interconnect 514. Memory access requests, including local load and store operations and remote read and write operations, are forwarded in accordance with the arbitration policy implemented by arbiter 505 to a dispatch pipeline 506 where each read/load and store request is processed with respect to directory 508 and cache array 502 over a given number of cycles.

L2 cache 110 also includes an RC queue 520 and a CPI (castout push intervention) queue 518 that respectively buffer data being inserted into and removed from the cache array 502. RC queue 520 includes a number of buffer entries that each individually correspond to a particular one of RC machines 512 such that each RC machine 512 that is dispatched retrieves data from only the designated buffer entry. Similarly, CPI queue 518 includes a number of buffer entries that each individually correspond to a particular one of the castout machines 510 and snoop machines 511, such that each CO machine 510 and each snoop machine 511 that is dispatched retrieves data from only the respective designated CPI buffer entry.

Each RC machine 512 also has assigned to it a respective one of multiple RC data (RCDAT) buffers 522 for buffering a memory block read from cache array 502 and/or received from local interconnect 514 via reload bus 523. The RCDAT buffer 522 assigned to each RC machine 512 is preferably constructed with connections and functionality corresponding to the memory access requests that may be serviced by the associated RC machine 512. As also discussed further below, some but not all of RCDAT buffers 522 have an associated store data multiplexer M4 that selects data bytes from among its inputs for buffering in the RCDAT buffer 522 in response unillustrated select signals generated by arbiter 505.

Figure 11:
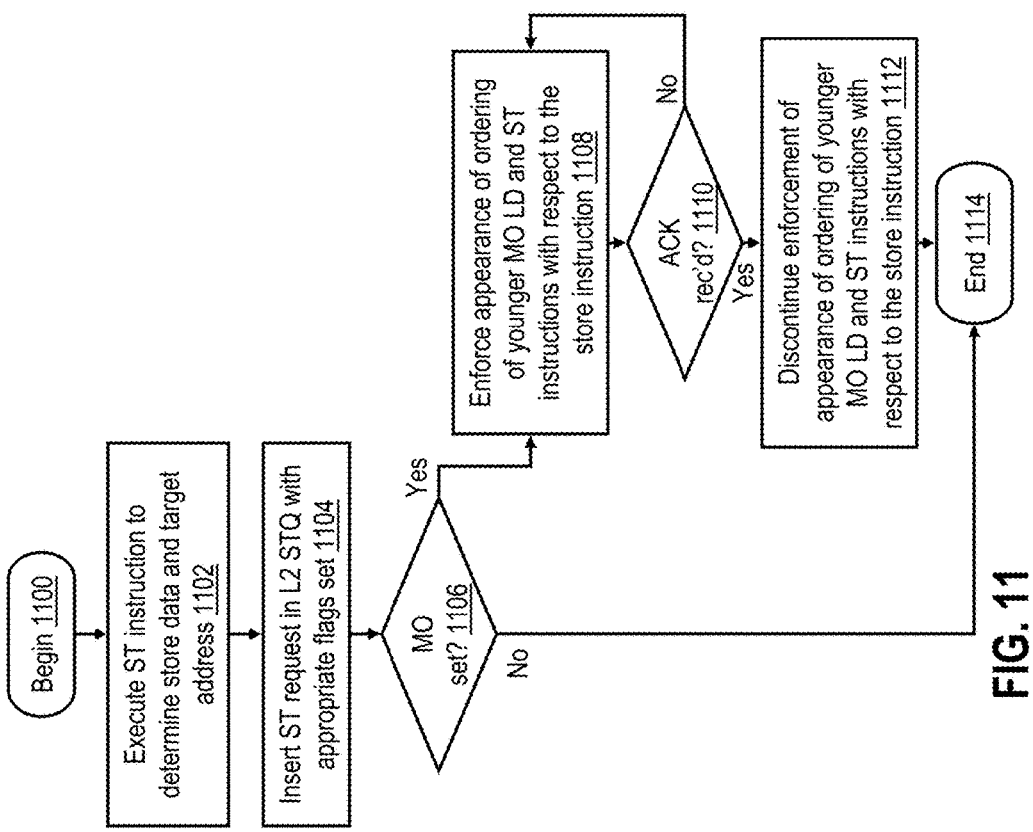
FIG. 11 is a high level logical flowchart of an exemplary process for executing a store instruction in processor core in accordance with one embodiment.
Figure 12:
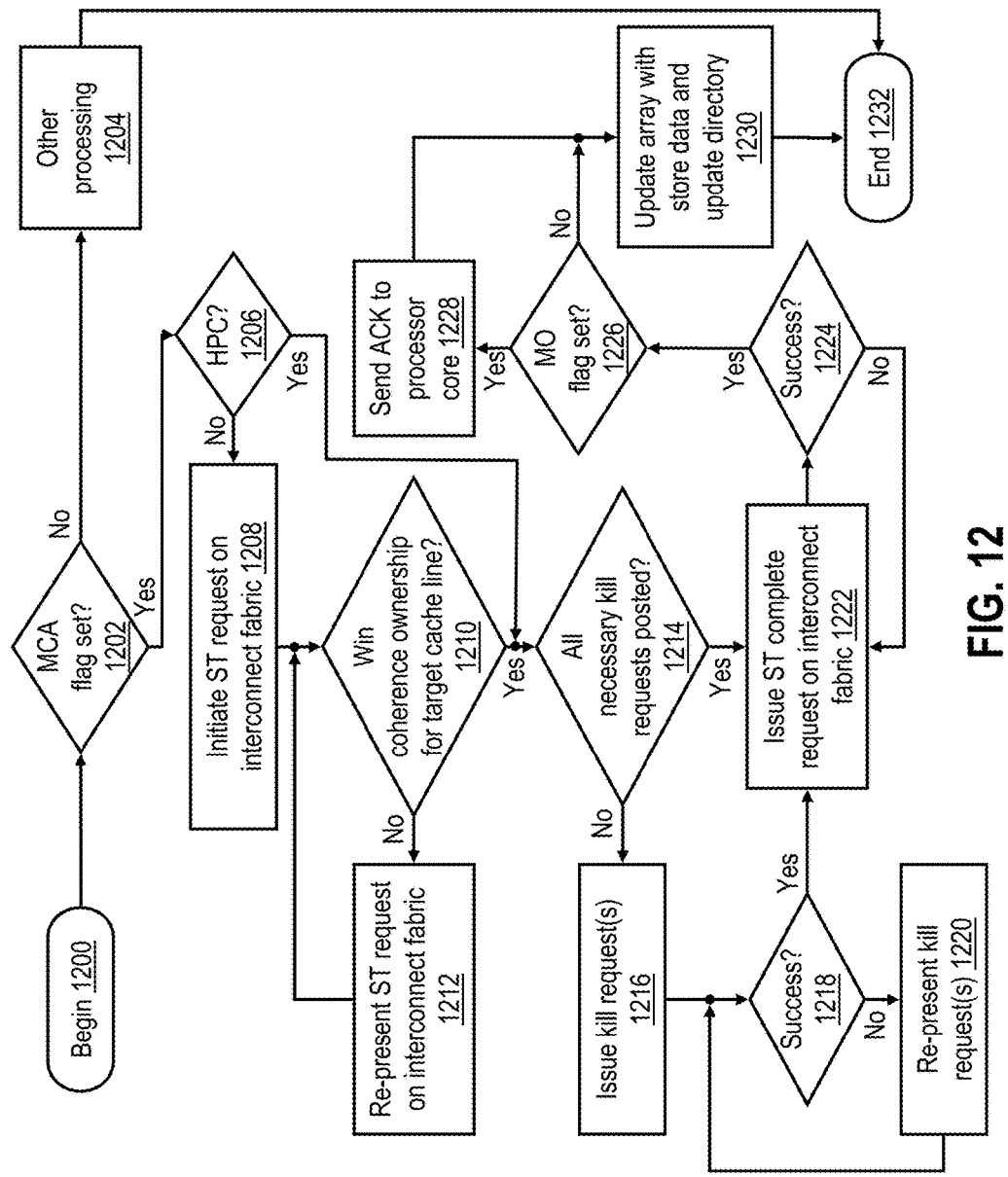
FIG. 12 is a high level logical flowchart of an exemplary process by which a memory subsystem services a multicopy atomic store request in accordance with one embodiment.

In operation, processor store requests, which may include, for example, a request type, target real address, store data and other fields as discussed below with reference to FIGS. 11-12, are received from the affiliated processor core 102 within a store queue (STQ) 504. STQ 504 also includes barrier resolving logic (not separately illustrated) for handling barrier instructions. When a barrier instruction reaches a head of STQ 504 (i.e., all store instructions prior to the barrier instruction have been pushed through STQ 504 and RC machines 512), the barrier resolving logic returns an acknowledgement (ACK) to processor core 102, which releases the barrier as described below with reference to block 808 of FIG. 8. From STQ 504, the store data are transmitted to store data multiplexer M4 via data path 524, and the store type and target address are passed to multiplexer M1. Multiplexer M1 also receives as inputs processor load requests from processor core 102 and directory write requests from RC machines 512. In response to unillustrated select signals generated by arbiter 505, multiplexer M1 selects one of its input requests to forward to multiplexer M2, which additionally receives as an input a remote request received from local interconnect 514 via remote request path 526. Arbiter 505 schedules local and remote memory access requests for processing and, based upon the scheduling, generates a sequence of select signals 528. In response to select signals 528 generated by arbiter 505, multiplexer M2 selects either the local request received from multiplexer M1 or the remote request snooped from local interconnect 514 as the next memory access request to be processed.

A request selected for processing by arbiter 505 is placed by multiplexer M2 into dispatch pipeline 506. Dispatch pipeline 506 preferably is implemented as a fixed duration pipeline in which each of multiple possible overlapping requests is processed for a predetermined number of clock cycles. For example, dispatch pipeline 506 may process each request for four cycles.

During a first cycle of processing within dispatch pipeline 506, a 1-cycle directory read is performed utilizing the request address to determine if the request address hits or misses in directory 508, and if the memory address hits, the coherency state of the memory block within directory 508. The directory information, which includes a hit/miss indication and the coherency state of the memory block, is returned by directory 508 to dispatch pipeline 506 in a subsequent cycle, such as the fourth cycle. As will be appreciated, no action is generally taken within an L2 cache 110 in response to miss on a remote memory access request; such remote memory requests are accordingly discarded from dispatch pipeline 506. However, in the event of a hit or miss on a local memory access request or a hit on a remote memory access request, L2 cache 110 will service the memory access request, which for requests that cannot be serviced entirely within processing unit 100, may entail communication on local interconnect 514 via fabric controller 516.

At a predetermined time during processing of the memory access request within dispatch pipeline 506, arbiter 505 transmits the request address to cache array 502 via address and control path 530 to initiate a cache read of the memory block specified by the request address. A cache read takes 2 cycles in one exemplary embodiment. The memory block read from cache array 502 is transmitted via data path 542 to error correcting code (ECC) logic 544, which checks the memory block for errors and, if possible, corrects any detected errors. For processor load requests, the memory block is also transmitted to load data multiplexer M3 via data path 540 for forwarding to the affiliated processor core 102.

At the last cycle of the processing of a memory access request within dispatch pipeline 506, dispatch pipeline 506 make a dispatch determination. For example, dispatch pipeline 506 may make the dispatch determination based upon a number of criteria, including (1) the presence of an address collision between the request address and a previous request address currently being processed by a castout machine 510, snoop machine 511 or RC machine 512, (2) the directory information, and (3) availability of an RC machine 512 or snoop machine 511 to process the memory access request. If dispatch pipeline 506 makes a dispatch determination that the memory access request is to be dispatched, the memory access request is dispatched from dispatch pipeline 506 to an RC machine 512 or a snoop machine 511. If the memory access request fails dispatch, the failure is signaled to the requestor (e.g., local or remote processor core 102) by a retry response. The requestor may subsequently retry the failed memory access request, if necessary.

While an RC machine 512 is processing a local memory access request, the RC machine 512 has a busy status and is not available to service another request. While an RC machine 512 has a busy status, the RC machine 512 may perform a directory write to update the relevant entry of directory 508, if necessary. In addition, the RC machine 512 may perform a cache write to update the relevant cache line of cache array 502. A directory write and a cache write may be scheduled by arbiter 505 during any interval in which dispatch pipeline 506 is not already processing other requests according to the fixed scheduling of directory reads and cache reads. When all operations for the given request have been completed, the RC machine 512 returns to an unbusy state.

It will be appreciated that the scheduling of non-fixed-schedule operations such as directory writes and cache writes can impact the scheduling of other operations, including those processed according to a fixed schedule.

Figure 6:
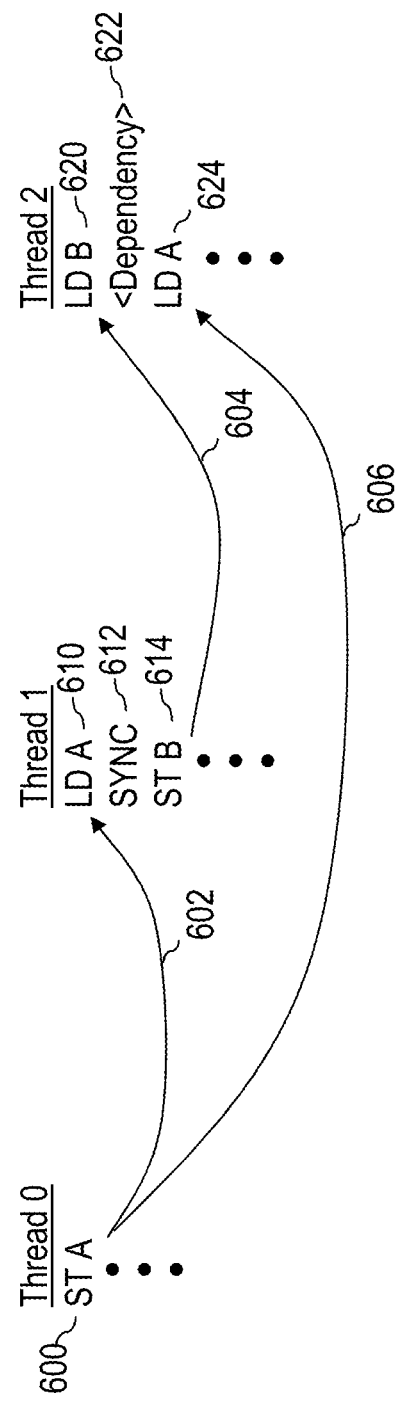
FIG. 6 depicts an example of a multithreaded program that includes an explicit barrier instruction to enforce ordering of memory access operations in accordance with the prior art.

Referring now to FIG. 6, there is depicted an example of a multithreaded program that includes an explicit barrier instruction to enforce ordering of memory access operations in accordance with the prior art. In this example, the multithreaded program executes on three concurrent hardware threads (Thread 0, Thread 1 and Thread 2), which in this example run on three different single-threaded processor cores.

As shown, Thread 0 includes store (ST) instruction 600, which stores a value to a storage location identified by effective address A. Thread 1 subsequently executes a load (LD) instruction 610 that reads the value at effective address A, as indicated by arrow 602. Following LD instruction 610, Thread 1 executes a barrier (SYNC) instruction 612, which is followed in program order by a ST instruction 614 that stores the value read by LD instruction 610 to effective address B.

Thread 2 includes a LD instruction 620, which reads the value stored to effective address B, as indicated by arrow 604. In addition, Thread 2 includes one or more data-dependent instructions 622 that use the value read by LD instruction 620 to compute the address A from which a subsequent LD instruction 624 reads. This data dependency causes LD instruction 624 to be executed after data-dependent instruction(s) 622. When executed, LD instruction 624 reads the value stored to effective address A by ST instruction 600, as indicated as arrow 606.

Barrier instruction 612 of Thread 1 enforces ordering of memory accesses logically preceding the barrier instruction 612 prior to those logically following barrier instruction 612 across all of Threads 0-2. In general, four different ordering cases are possible with respect to a barrier instruction, such as barrier instruction 612. These orderings include: (1) ST-to-ST, in which the memory update made by a ST instruction logically prior to barrier instruction 612 (e.g., ST instruction 600, which is logically prior to barrier instruction 612 by virtue of the read made by LD instruction 610) is ordered prior to the ST instruction following barrier instruction 612 (e.g., ST instruction 614); (2) ST-to-LD, in which a ST instruction logically prior to barrier instruction 612 (e.g., ST instruction 600) is ordered prior to LD instruction logically following the barrier instruction 612 (e.g., LD instruction 620); (3) LD-to-LD, in which a LD instruction logically prior to barrier instruction 612 (e.g., LD instruction 610) is ordered prior to a LD instruction logically following barrier instruction 612 (e.g., LD instruction 620); and (4) LD-to-ST, in which a LD instruction logically prior to barrier instruction 612 (e.g., LD instruction 610) is ordered prior to a ST instruction following barrier instruction 612 (e.g., ST instruction 614). In conventional implementations, memory access instructions logically following a barrier instruction are permitted to be executed when: (1) all LD instructions logically preceding the barrier instruction have had their target values returned to the requesting processor core(s), and (2) all ST instructions logically preceding the barrier instruction have been resolved in the memory subsystem as indicated by receipt of an acknowledgment (ACK) from the memory subsystem to a broadcast of a barrier request initiated by execution of the barrier instruction (e.g., the prior stores are visible to all processors).

By enforcing ST-to-ST and ST-to-LD ordering in this manner, barrier instruction 612 provides the appearance of multicopy atomicity to all threads for like-size memory accesses. Thus, for example, assuming all LD and ST instruction in the program of FIG. 6 access data with like sized operations, barrier instruction 612 ensures that LD instruction 624 of Thread 2 reads the same value as load instruction 610.

Figure 7:
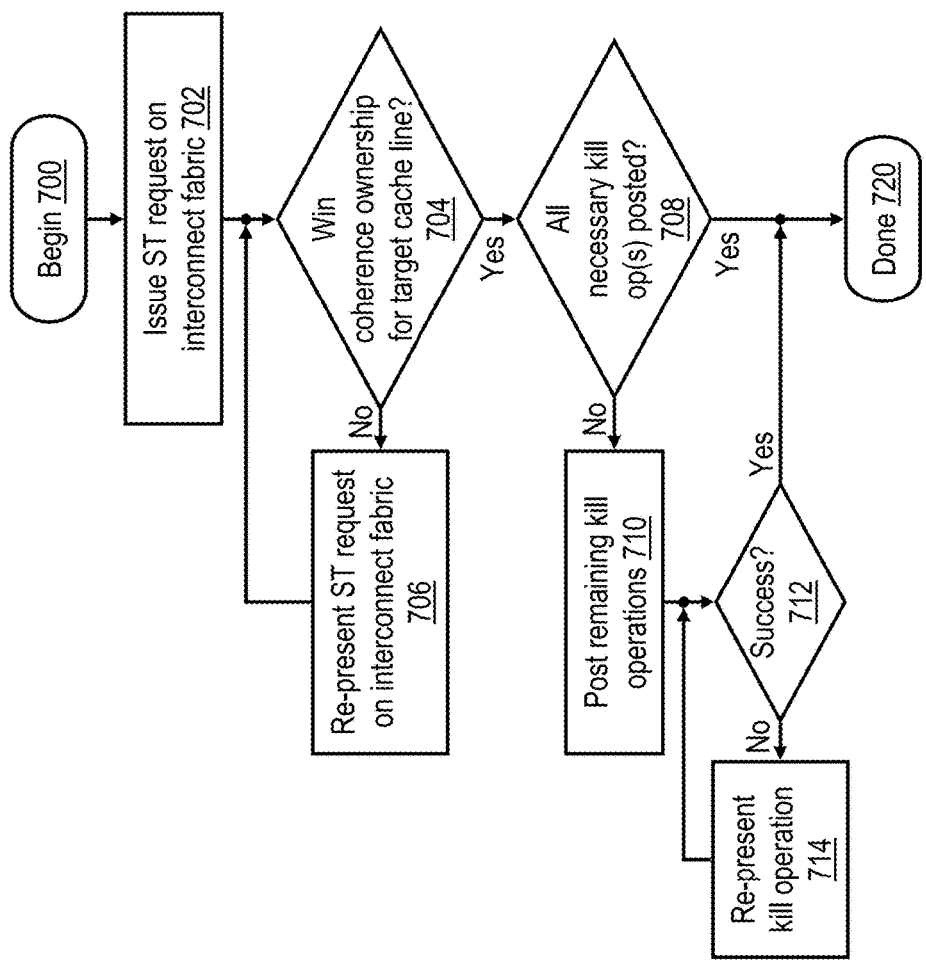
FIG. 7 is a flowchart of a store operation in accordance with the prior art.

With reference now to FIG. 7, there is illustrated a flowchart of a prior art process for performing a store operation in a data processing system implementing a snoop-based coherence protocol. The process begins at block 700, for example, in response to execution by a processing unit of a store instruction (e.g., ST instruction 600 of FIG. 6). In response to execution of the store instruction and a subsequent failure of the target address of the store instruction to hit in the local cache hierarchy in a coherence state that permits the requested memory update to be performed without communication with other processing units that may cache the target cache line, the process proceeds to block 702, which depicts the processing unit issuing a store request on the interconnect fabric of the data processing system. At block 704, the processing unit determines from coherence messages received in response to the store request whether or not the store request won coherence ownership of the target cache. If not, the initiating processing unit re-presents the store request on the interconnect fabric, as shown at block 706 until coherence ownership of the target cache line is successfully obtained.

In response to the initiating processing unit determining at block 704 its has successfully obtained coherence ownership of the target cache line, the initiating processing unit determines at block 708 whether or not any and all kill operation(s) required to invalidate any existing cached copies of the target cache line have been posted (i.e., issued on the interconnect fabric and accepted by all other coherence participants that may cache a copy of the target cache line). If so, the process of ends at block 720. If not, the process passes to block 710, which illustrates the initiating processing unit posting one or more kill operations via the interconnect fabric in order to invalidate all other copies of the target cache line. The process then passes to blocks 712-714, which illustrates the initiating processing unit representing one or more kill operations directed to the target cache line until all of the kill operations have been successfully posted (i.e., accepted by all other coherence participants that may cache a copy of the un-updated target cache line), as indicated by one or more coherence messages. Following a determination at block 712 that all kill operations for the target cache line have been successfully posted, the process of FIG. 7 ends at block 720.

Figures 8, 9, 10:
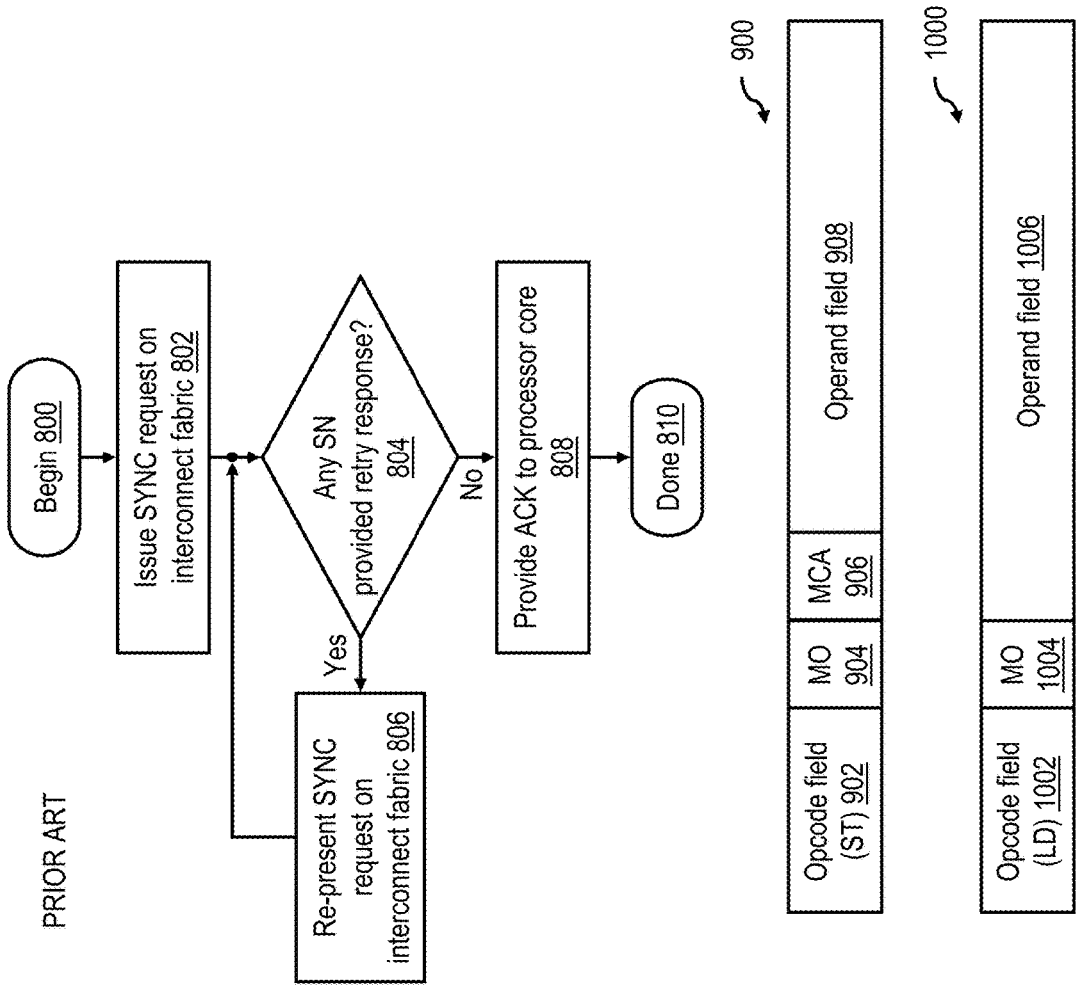
FIG. 8 is a flowchart of a barrier operation in accordance with the prior art.
FIG. 9 illustrates an exemplary multicopy atomic (MCA) store instruction in accordance with one embodiment.
FIG. 10 depicts an exemplary load instruction including a memory ordering (MO) flag in accordance with one embodiment.

Referring now to FIG. 8, there is depicted a flowchart of a prior art process for enforcing a barrier in a data processing system implementing a snoop-based coherence protocol when the barrier has reached the head of STQ 504 and all older stores in STQ 504 have finished processing by RC machines 512. The process of FIG. 8 begins at block 800, for example, in response to execution by an initiating processing unit of a barrier instruction (e.g., barrier instruction 612 of FIG. 6). In response to execution of the barrier instruction, the initiating processing unit issues a SYNC request on the interconnect fabric (block 802). For the barrier instruction to enforce ST-to-ST and ST-to-LD ordering, the SYNC request must be successfully snooped by all processing units that executed a store instruction logically preceding the barrier instruction or that received a posted kill operation for a store instruction logically preceding the barrier instruction. Consequently, if at block 804 the initiating processing unit determines from one or more coherence messages that at least one processing unit did not snoop the SYNC request issued at block 802 or at least one kill request for a prior store ordered by the SYNC is still pending (e.g., at least one Retry coherence response to the SYNC request is received), the initiating processing unit represents the SYNC request on the interconnect fabric one or more times until the received coherence responses indicate success of the SYNC operation, that is, that all prior stores ordered by the SYNC have fully propagated. The success of the SYNC operation guarantees that the other processing units have performed any stores preceding and ordered by the barrier and have invalidated any cached copies of the target cache line as required by the posted kill operations prior to executing any load or store instructions logically following the barrier instruction.

In response to a determination at block 804 that all other processing units successfully snooped the SYNC operation, the initiating processing unit provides an ACK response to the processor core that executed the barrier instruction (block 808). As discuss above, this ACK response enables the thread containing the barrier instruction to resume dispatch and execution of memory access instructions following the barrier instruction. Thereafter, the process of FIG. 8 ends at block 810.

In summary, the prior art processes depicted in FIGS. 6-8 employ a barrier instruction and an associated broadcast barrier (SYNC) operation to enforce a desired ordering of memory access operations and to provide the appearance of multicopy atomicity for like-size memory accesses in a multithreaded data processing system employing a weak memory model. However, these prior art processes do not guarantee full sequential consistency and thus multicopy atomicity in the presence of overlapping mixed-size accesses.

In accordance with one aspect of the present disclosure, the appearance of multicopy atomicity in a data processing system implementing a weak memory model is restored by implementing a store instruction that itself provides multicopy atomicity directly. Turning now to FIG. 9, there is illustrated an exemplary embodiment of such a store instruction 900. In the illustrated embodiment, store instruction 900 includes an opcode (operation code) field 902 including an architecturally determined number of bits specifying an opcode indicating that the instruction is a store instruction that performs an update to the shared memory system (e.g., of data processing system 200).

Store instruction 900 also includes a memory ordering (MO) flag 904 and a multicopy atomic (MCA) flag 906, which may form a portion of opcode field 902 or be implemented as separate fields of store instruction 900. In one embodiment, each of MO flag 904 and MCA flag 906 can be implemented utilizing a respective bit. When set (e.g., to 1), MO flag 904 indicates that store instruction 900 is to be executed by the executing processor core in-order (or given the effect of in-order execution) with respect to all subsequent memory access instructions in the same hardware thread that are also marked by a set MO flag. When MO flag 904 is reset (e.g., to 0), the executing processor core can execute store instruction 900 in any order with respect to other memory access instructions in the same thread, as long as data dependencies are observed.

The MCA flag 906 also has a set state (e.g., 1) and a reset state (e.g., 0). When set, MCA flag 906 indicates that the update to the memory subsystem made in response to execution of store instruction 900 should be performed to provide the effect of multicopy atomicity. When reset, MCA flag 906 indicates that execution of store instruction 900 need not be performed to provide the effect of multicopy atomicity. In various embodiments, MO flag 904 and MCA flag 906 can be set or reset by a programmer and/or compiler.

Store instruction 900 finally includes an operand field 908, which directly or indirectly references one or more operands from which the store data and the target effective address of the store instruction can be determined.

Referring now to FIG. 10, there is depicted an exemplary embodiment of such a load instruction 1000 in accordance with one embodiment. In the depicted embodiment, store instruction 1000 includes an opcode (operation code) field 1002 including an architecturally determined number of bits specifying an opcode indicating that the instruction is a load instruction that reads a value from the shared memory system (e.g., of data processing system 200). Store instruction 1000 also includes a memory ordering (MO) flag 1004, which may form a portion of opcode field 1002 or be implemented as a separate field of load instruction 1000. When set (e.g., to 1), MO flag 1004 indicates that load instruction 1000 is to be executed by the executing processor core in-order (or given the effect of in-order execution) with respect to all subsequent memory access instructions in the same hardware thread that are also marked by a set MO flag. When MO flag 1004 is reset (e.g., to 0), the executing processor core can execute load instruction 1000 in any order with respect to other memory access instructions in the same thread, as long as dependencies are observed. Load instruction 1000 finally includes an operand field 1006, which directly or indirectly references one or more operands from which the target effective address of the load instruction can be determined.

With reference now to FIG. 11, there is illustrated a high level logical flowchart of an exemplary process for executing a store instruction in a processor core 102 in accordance with one embodiment. The process of FIG. 11 begins at block 1100 and then proceeds to block 1102, which illustrates an execution unit 106 of a processor core 102 (e.g., LSU 555 of FIG. 5) executing a store instruction, such as store instruction 900 of FIG. 9. The store instruction can be, for example, part of a multithreaded program including a plurality of memory access instructions requesting mixed size access to a shared memory (including mixed size access to a common target cache line). Execution of the store instruction includes determination of the value to written to the memory subsystem (typically stored in one or more registers of the processor core 102) and computation of the target effective address of the store instruction from the contents of operand field 908. Following translation of the target effective address to obtain a target real address of a store instruction, the processor core 102 inserts a corresponding store request into STQ 504 of the associated L2 cache 110 (block 1104). In one embodiment, the store request includes (1) the target real address, (2) the value to written to the memory subsystem, and (3) MO and MCA flags that are set or reset in accordance with the MO field 904 and MCA field 906, respectively, of the store instruction.

As indicated at block 1106, if the MO flag 904 of the store instruction is reset, processing of the store instruction by the processor core 102 is complete, and the process of FIG. 11 ends at block 1114. However, if the MO flag 904 of the store instruction is set, processor core 102 enforces the appearance of in-program-order execution, with respect to the store instruction, of each younger load and store instruction having its MO flag 904 or 1004 set (block 1108). In some embodiments, processor core 102 enforces this ordering by temporarily pausing execution of younger load and store instructions in the same thread having their MO flags 904 or 1004 set. In alternative embodiments, processor core 102 may instead speculatively continue processing younger load and/or store instructions in the same thread having their MO flags 904 or 1004 set as long as the execution results of such instructions remain private to the executing thread and are not exposed to other threads. In embodiments supporting multithreaded processor cores 102, maintaining speculative execution results private to the initiating thread may include, for example, the initiating thread taking one or more lines of its L1 cache 108 private. As indicated at block 1110, the processor core 102 continues to enforce the appearance of in-program-order execution of younger load and/or store instructions in the same thread having their MO flags 904 or 1004 set until an ACK (acknowledgment) response for the store instruction has been received from the associated L2 cache 110. In response to receipt of the ACK response for the store instruction, the processor core 102 discontinues enforcing the appearance of in-program-order execution of younger load and/or store instructions in the same thread having their MO flags 904 or 1004 set (block 1112). Thereafter, the process of FIG. 11 ends at block 1114.

Referring now to FIG. 12, there is depicted a high level logical flowchart of an exemplary process by which a memory subsystem services a multicopy atomic store request in a data processing system implementing a weak memory model and a snoop-based coherence protocol. The process begins at block 1200, for example, in response to L2 cache 110 selecting a store request of one of its associated processor cores 102 from STQ 504 for processing. The process then proceeds from block 1200 to block 1202, which depicts L2 cache 110 determining whether or not the MCA flag for the store request is set. If not, L2 cache 110 performs other unillustrated processing (block 1204) to service the store request, and the process of FIG. 12 ends at block 1232.

If, however, the L2 cache 110 determines at block 1202 that the MCA flag of the store request is set, L2 cache 110 further determines at block 1206 whether it is currently the HPC for the target real address of the store request, for example, by reference to the coherence state in directory 508 of the target real address of the store request. If so, the process passes from block 1206 to block 1214, which is described below. If, however, processing unit 102 determines that it is not currently the HPC for the target real address of the store request, an RC machine 512 of L2 cache 110 initiates a store request on the interconnect fabric of data processing system 200 (block 1208). The store request may include, for example, an operation type field indicating that the type of the request is a write or partial write and an address field identifying the target real address of the write request. The store request preferably further includes source identifying information, such as a core number field in which the initiating RC machine 512 uniquely identifies the processor core 102 that initiated the store request and an RC number field specifying which RC machine 512 of the L2 cache 110 issued the store request. Based on the Cresp received in response the store request initiated on the interconnect fabric, the RC machine 512 determines at block 1210 whether or not it was successful in obtaining coherence ownership (i.e., in becoming the HPC) for the target real address of the store request. If so, the process passes from block 1210 to block 1214, which is described below. However, if the RC machine 512 determines at block 1210 that it was not successful in obtaining coherence ownership for the target real address of the store request (e.g., the Cresp was Retry), the RC machine 512 re-presents the store request on the interconnect fabric (block 1212), and the process returns to block 1210.

Block 1214 illustrates the RC machine 512 determining whether or not all kill requests necessary to complete the transfer of coherence ownership of the target real address to the L2 cache 110 (if any) have been posted (i.e., issued on the interconnect fabric and accepted by all relevant coherence participants). If so, the process proceeds from block 1214 to block 1222, which is described below. If, however, not all kill requests necessary to complete the transfer of coherence ownership of the target real address to the L2 cache 110 have been posted, the RC machine 512 issues one or more kill requests on the interconnect fabric of data processing system 200 in order to invalidate any remaining cached copies of the target cache line held at other processing units 100 (block 1216). The kill requests may include, for example, an operation type field indicating that the type of the request is a kill request, an address field identifying the target real address of the kill request, and the same source identifying information as contained in the associated store request. The RC machine 512 then determines at block 1218 whether or not the kill request(s) issued at block 1216 were successfully posted at (i.e., accepted by) all other relevant coherence participants that may cache a copy of the un-updated target cache line, for example, by reference to the coherence responses received in response to the kill request(s) (block 1218). In response to the RC machine 512 determining at block 1218 that the kill request(s) were successfully posted, the process proceeds to block 1222, which is described below.

Figures 13, 14:
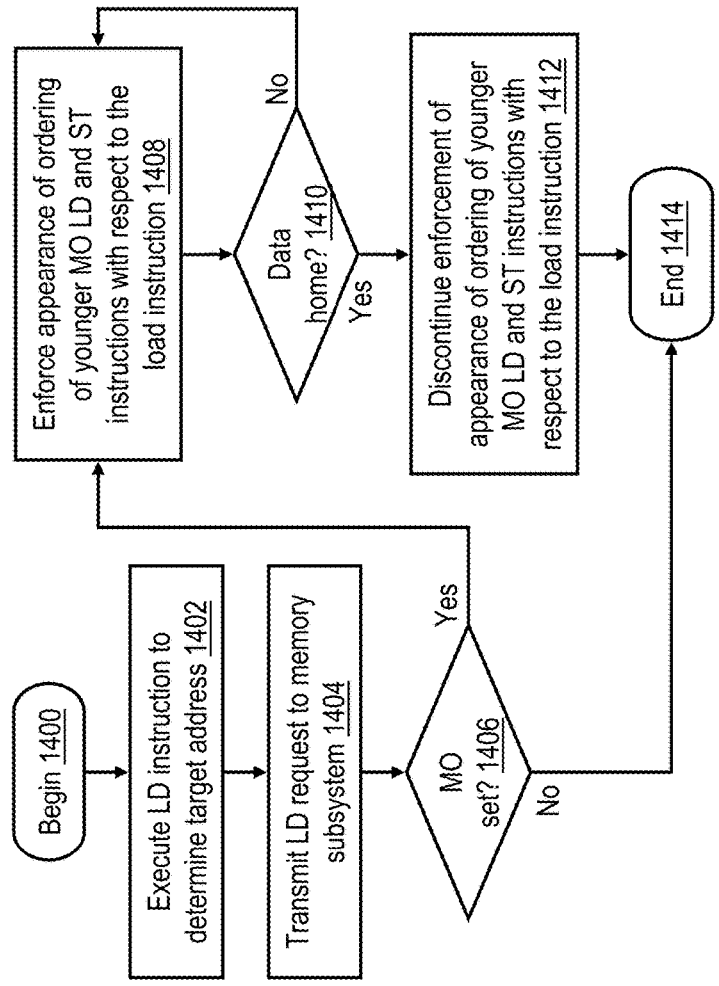
FIG. 13 is a block diagram of an exemplary store complete request on an interconnect fabric of a data processing system in accordance with one embodiment.
FIG. 14 is a high level logical flowchart of an exemplary process for executing a load instruction in accordance with one embodiment.

At block 1222, RC machine 512 next ensures multicopy atomicity for the store instruction across all processing units 102 by ensuring that all other copies of the target cache line have been invalidated prior to making the new value visible to any other processing unit. To accomplish this, RC machine 512 broadcasts a store complete request to all relevant coherence participants via the interconnect fabric to determine if any of them are still working on the store request and/or the associated kill request(s). As shown in FIG. 13, in one embodiment, a store complete request 1300 includes an operation type field 1302 containing an architecturally determined set of bits specifying a store complete request, as well as a core number field 1304 and an RC number field 1306 that specify the same source identifying information as the related store request and kill request(s). As indicated by ellipsis, store complete request 1300 may optionally include one or more additional fields.

In one embodiment, each coherence participant that snoops the store complete request issued at block 1222 provides a Retry Presp that prevents the store complete request from completing successfully if that coherence participant is currently processing a kill request for the same combination of core number and RC number as specified in the store complete request. If the coherence participant is not currently processing a kill request for the same combination of core number and RC number as specified in the store complete request, the coherence participant does not provide a Retry Presp. Thus, at block 1224, the RC machine 512 that initiated the store complete request determines by reference to the Cresp whether or not at least one Retry Presp was received in response to the store complete request. If so, the store complete request was not successful, and the RC machine 512 represents the store complete request on the interconnect fabric, as indicated by the process returning to block 1222. If, however, the RC machine 512 that initiated the store complete request determines at block 1224 that no Retry coherence response was received in response to the store complete request (e.g., a Cresp indicating success was received), meaning that all other cached copies of the target cache line have been invalidated, the process proceeds to block 1226.

Block 1226 illustrates the RC machine 512 determining whether or not the MO flag of the store request was set to indicate that program ordering should be enforced for the original store instruction. If not, the process proceeds directly to block 1230, which is described below. If, however, RC machine 512 determines that the MO flag of the store request was set, RC machine 512 returns an ACK response to the initiating processor core 102 via signal line 556 of FIG. 5 (block 1228). In response to receipt of the ACK response, the processor core 102 discontinues enforcement of the appearance of ordering younger load and store instructions having their MO flag 904 or 1004 flags set, as described above with reference to block 1112 of FIG. 11. The process then proceeds to block 1230.

At block 1230, the RC machine 512 directs an update of the target cache line in cache array 502 with the store data of the store request, and if necessary, an update to the corresponding entry of directory 508. The update to the target cache line indicated at block 1230 can be performed non-speculatively at any point after coherence ownership of the target cache line is obtained at block 1210 (and in some embodiments, can be performed speculatively prior to that point). However, to impart the appearance of multicopy atomicity, the update to the cache line made by the store request is made visible to all other threads no earlier than block 1230. In part, the RC machine 512 ensures the multicopy atomicity of this update by forcing a Retry Presp in response to any memory access request that targets the target cache line and that is snooped while the RC machine 512 is allocated to service the multicopy atomic store request. Following block 1230, the RC machine 512 allocated to service the multicopy atomic store request is deallocated (i.e., returns to an idle state, thereby allowing the new value to be read by other processor cores 102), and the process of FIG. 12 ends at block 1232.

Referring now to FIG. 14, there is depicted a high level logical flowchart of an exemplary process for enforcing ordering for the load instruction in accordance with one embodiment. The process of FIG. 14 begins at block 1400 and then proceeds to block 1402, which illustrates an execution unit 106 of a processor core 102 (e.g., LSU 555 of FIG. 5) executing a load instruction, such as store instruction 1000 of FIG. 10. Execution of the load instruction includes computation of the target effective address of the load instruction from the contents of operand field 1006. Following translation of the target effective address to obtain a target real address of the load instruction, the processor core 102 transmits a load request specifying the target real address to the memory subsystem in order to obtain the load data residing at the target real address (block 1404).

As indicated at block 1406, if the MO flag 1004 of the load instruction is reset, processing of the load instruction by the processor core 102 is complete, and the process of FIG. 14 ends at block 1414. However, if the MO flag 1004 of the load instruction is set, processor core 102 enforces the appearance of in-program-order execution, with respect to the load instruction, of each younger load and store instruction having its MO flag 904 or 1004 set (block 1408). In some embodiments, processor core 102 enforces this ordering by temporarily pausing execution of younger load and store instructions in the same thread having their MO flags 904 or 1004 set. In alternative embodiments, processor core 102 may instead speculatively continue processing of younger load and/or store instructions in the same thread having their MO flags 904 or 1004 set as long as the execution results of such instructions remain private to the executing thread and are not exposed to other threads. In embodiments supporting multithreaded processor cores 102, maintaining speculative execution results private to the initiating thread may include, for example, the initiating thread taking one or more lines of its L1 cache 108 private. As indicated at block 1410, the processor core 102 continues to enforce the appearance of in-program-order execution of younger load and/or store instructions in the same thread having their MO flags 904 or 1004 set until the load data requested by the load instruction is "data home" (e.g., has been received by the processor core 102 from the memory subsystem). In response to receipt of the load data requested by the load instruction, the processor core 102 discontinues enforcing the appearance of in-program-order execution of younger load and/or store instructions in the same thread having their MO flags 904 or 1004 set (block 1412). Thereafter, the process of FIG. 14 ends at block 1414.

Figure 15:
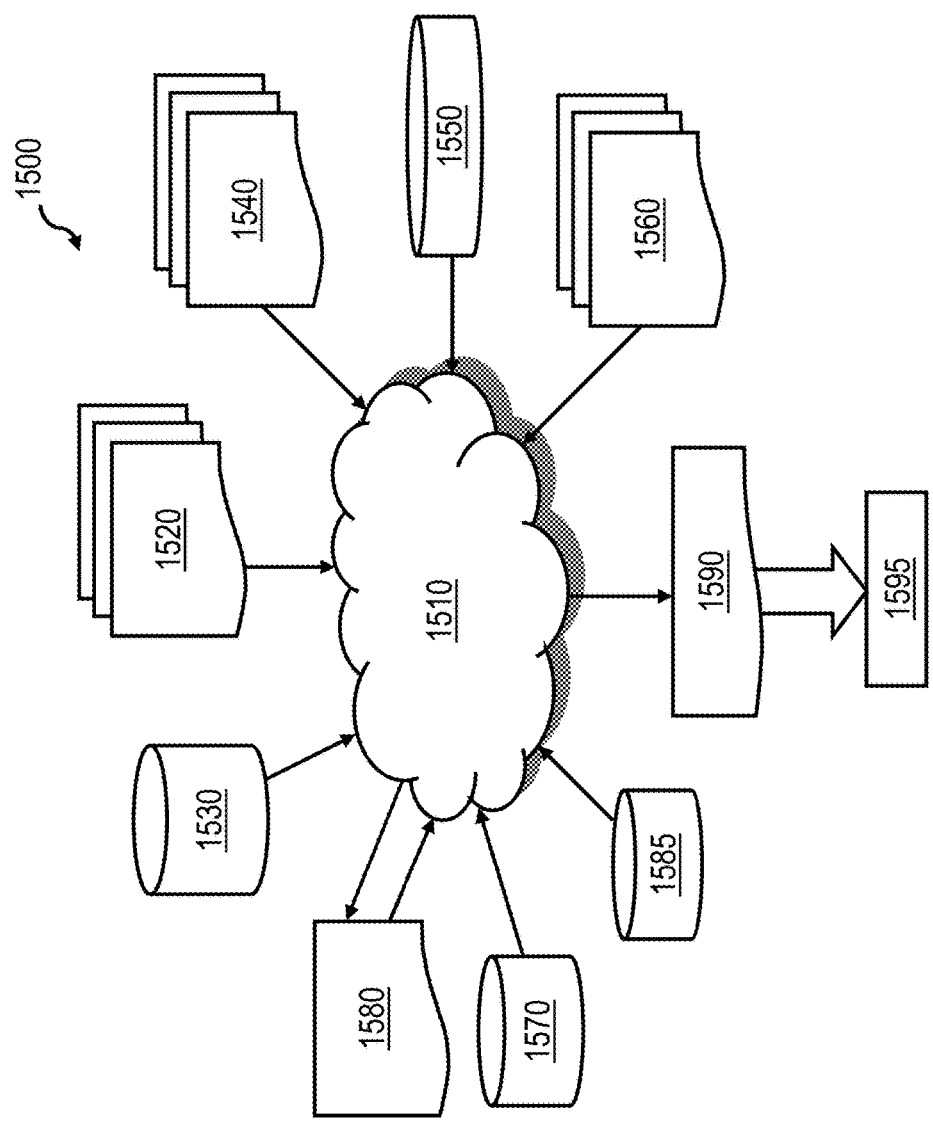
FIG. 15 is a block diagram of an exemplary design flow in accordance with one embodiment.

With reference now to FIG. 15, there is depicted a block diagram of an exemplary design flow 1500 used for example, in semiconductor IC logic design, simulation, test, layout, and manufacture. Design flow 1500 includes processes, machines and/or mechanisms for processing design structures or devices to generate logically or otherwise functionally equivalent representations of the design structures and/or devices described above and illustrated herein. The design structures processed and/or generated by design flow 1500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1500 may vary depending on the type of representation being designed. For example, a design flow 1500 for building an application specific IC (ASIC) may differ from a design flow 1500 for designing a standard component or from a design flow 1500 for instantiating the design into a programmable array, for example a programmable gate array (PGA) or a field programmable gate array (FPGA) offered by Altera® Inc. or Xilinx® Inc.

FIG. 15 illustrates multiple such design structures including an input design structure 1520 that is preferably processed by a design process 1510. Design structure 1520 may be a logical simulation design structure generated and processed by design process 1510 to produce a logically equivalent functional representation of a hardware device. Design structure 1520 may also or alternatively comprise data and/or program instructions that when processed by design process 1510, generate a functional representation of the physical structure of a hardware device. Whether representing functional and/or structural design features, design structure 1520 may be generated using electronic computer-aided design (ECAD) such as implemented by a core developer/designer. When encoded on a machine-readable data transmission, gate array, or storage medium, design structure 1520 may be accessed and processed by one or more hardware and/or software modules within design process 1510 to simulate or otherwise functionally represent an electronic component, circuit, electronic or logic module, apparatus, device, or system such as those shown in FIGS. 1-3. As such, design structure 1520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1510 preferably employs and incorporates hardware and/or software modules for synthesizing, translating, or otherwise processing a design/simulation functional equivalent of the components, circuits, devices, or logic structures shown in FIGS. 1-3 to generate a netlist 1580 which may contain design structures such as design structure 1520. Netlist 1580 may comprise, for example, compiled or otherwise processed data structures representing a list of wires, discrete components, logic gates, control circuits, I/O devices, models, etc. that describes the connections to other elements and circuits in an integrated circuit design. Netlist 1580 may be synthesized using an iterative process in which netlist 1580 is resynthesized one or more times depending on design specifications and parameters for the device. As with other design structure types described herein, netlist 1580 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1510 may include hardware and software modules for processing a variety of input data structure types including netlist 1580. Such data structure types may reside, for example, within library elements 1530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1540, characterization data 1550, verification data 1560, design rules 1570, and test data files 1585 which may include input test patterns, output test results, and other testing information. Design process 1510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1510 without deviating from the scope and spirit of the invention. Design process 1510 may also include modules for performing standard circuit design processes such as timing analysis, verification, design rule checking, place and route operations, etc.

Design process 1510 employs and incorporates logic and physical design tools such as HDL compilers and simulation model build tools to process design structure 1520 together with some or all of the depicted supporting data structures along with any additional mechanical design or data (if applicable), to generate a second design structure 1590. Design structure 1590 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1520, design structure 1590 preferably comprises one or more files, data structures, or other computer-encoded data or instructions that reside on transmission or data storage media and that when processed by an ECAD system generate a logically or otherwise functionally equivalent form of one or more of the embodiments of the invention depicted herein. In one embodiment, design structure 1590 may comprise a compiled, executable HDL simulation model that functionally simulates the devices depicted herein.

Design structure 1590 may also employ a data format used for the exchange of layout data of integrated circuits and/or symbolic data format (e.g., information stored in a GDSII (GDS2), GL1, OASIS, map files, or any other suitable format for storing such design data structures). Design structure 1590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1590 may then proceed to a stage 1595 where, for example, design structure 1590: proceeds to tape-out, is released to manufacturing, is released to a mask house, is sent to another design house, is sent back to the customer, etc.

As has been described, in at least one embodiment, a data processing system implementing a weak memory model includes a plurality of processing units coupled to an interconnect fabric. In response execution of a multicopy atomic store instruction, an initiating processing unit broadcasts a store request on the interconnect fabric to obtain coherence ownership of a target cache line. The initiating processing unit posts a kill request to at least one of the plurality of processing units to request invalidation of a copy of the target cache line. In response to successful posting of the kill request, the initiating processing unit broadcasts a store complete request on the interconnect fabric to enforce completion of the invalidation of the copy of the target cache line. In response to the store complete request receiving a coherence response indicating success, the initiating processing unit permits an update to the target cache line requested by the multicopy atomic store instruction to be atomically visible. In this manner, the appearance of multicopy atomicity can be preserved in the presence of mixed-size accesses without execution of a separate barrier instruction. Further, in at least some embodiments, the store instruction can also selectively be utilized to enforce program ordering of at least certain subsequent memory access instruction with respect to the store instruction through use of a memory ordering flag.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system cause the data processing system to perform the operations described herein. The program product may include data and/or instruction that when executed or otherwise processed generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system implementing a weak memory model, wherein the data processing system includes a plurality of processing units coupled to an interconnect fabric, the method comprising:

in response to executing a multicopy atomic store instruction in a processor core, an initiating processing unit broadcasting a store request on the interconnect fabric to a plurality of processing units to obtain coherence ownership of a target cache line of the multicopy atomic store instruction;

the initiating processing unit posting a kill request to at least one of the plurality of processing units to request invalidation of a copy of the target cache line said at least one of the plurality of processing units;

in response to successful posting of the kill request, the initiating processing unit broadcasting a store complete request on the interconnect fabric to enforce completion of the invalidation of the copy of the target cache line by the said at least one of the plurality of processing units; and in response to the store complete request receiving a coherence response indicating success, permitting an update to the target cache line requested by the multicopy atomic store instruction to be visible to all of the plurality of processing units.

2. The method of claim 1, wherein:

the initiating processing unit includes a store-in cache; and the method further comprises the processor core transmitting to the store-in cache a store request including a multicopy atomic flag that is set.

3. The method of claim 1, wherein the posting includes the initiating processing unit posting the kill request in response to obtaining coherence ownership of the target cache line.

4. The method of claim 1, and further comprising:

the processor core enforcing program ordering of at least one subsequent memory access instruction with respect to the store instruction in response to a memory ordering flag within the store instruction being set; and the processor core refraining from enforcing program ordering of the at least one subsequent memory access request with respect to the store instruction in response to the memory ordering flag not being set.

5. The method of claim 4, wherein the enforcing includes enforcing the program ordering of the at least one subsequent memory access instruction with respect to the store instruction in absence of a barrier instruction.

6. The method of claim 1, and further comprising the data processing system executing a program containing a plurality of memory access instructions requesting mixed size memory accesses, wherein the plurality of memory access instructions includes the multicopy atomic store instruction.

7. The method of claim 1, wherein:

the initiating processing unit includes multiple read-claim machines that initiate requests on the interconnect fabric; and the store complete request identifies the initiating processing unit and identifies which of the multiple read-claim machines initiated the store request.

\* \* \* \* \*